United States Patent [19]
Takagi et al.

[11] 3,771,370
[45] Nov. 13, 1973

[54] SENSOR FOR A POSITIVE OR NEGATIVE ACCELERATION RESPONSIVE SWITCH

[75] Inventors: Katsuyuki Takagi, Gifu; Tatsuo Kato, Nagoya, both of Japan

[73] Assignee: Kabushiki Kaisha Tokai Rika Denki Seisakasho, Nishikasugai-gun, Aichi Prefecture, Japan

[22] Filed: Dec. 17, 1971

[21] Appl. No.: 209,143

[52] U.S. Cl. ............................................. 73/517 R
[51] Int. Cl. .......................................... G01p 15/08
[58] Field of Search ................... 73/516 LM, 517 R, 73/517 B, 516 R, 492; 200/61.45 R, 61.45 M, 61.47

[56] References Cited
UNITED STATES PATENTS

| | | | |
|---|---|---|---|
| 2,415,086 | 2/1947 | Detwiler | 200/61.45 UX |
| 3,665,769 | 5/1972 | Morris | 73/517 R |
| 3,555,219 | 1/1971 | Johnson et al. | 200/61.47 |
| 3,497,808 | 2/1970 | Goodman et al. | 200/61.45 R X |

Primary Examiner—James J. Gill
Attorney—Woodhams, Blanchard & Flynn

[57] ABSTRACT

A sensor for a positive or negative acceleration responsive switch for detecting an acceleration exceeding a predetermined level applied to a moving body. A bowl having a reverse conical wall at its upper peripheral surface is mounted horizontally to the moving body, and a turning coil which forms a part of an oscillator circuit is disposed at the lower portion of the bowl. Within the bowl, a conductive medium such as metallic ball or conductive liquid, e.g., mercury is placed so that it is displaced under an acceleration applied in any horizontal direction. The acceleration may be detected based on the distance of the conductive medium from the tuning coil.

11 Claims, 4 Drawing Figures

SENSOR FOR A POSITIVE OR NEGATIVE ACCELERATION RESPONSIVE SWITCH

The present invention relates to a sensor for a positive or negative acceleration responsive switch and more particularly to a sensor of the kind to be mounted on an automobile for detecting an acceleration exceeding a predetermined level applied to the automobile.

In recent years, with the development of highway networks, a driving speed of the automobiles has become higher and higher, and traffic accidents have been increased accordingly. To avoid fatal wound at the time of such traffic accidents, a seat belt has come to be equipped in an automobile. There are two types of seat belts; one is of fixed type and the other is of wind-up type. The former serves to fix a body of a driver or passenger to a seat. Accordingly the body of the driver or the passenger is always bound to the seat and hence this type of seat belt is not suitable for use in a long-time driving. On the other hand, the latter type, i.e., the wind-up type of the seat belt eliminates the disadvantage of the fixed type just mentioned above. Since the belt of the latter type may be freely extended or retracted during a normal running condition of the automobile or when the automobile is stopped, without being controlled by an automatic winder, the body of the driver or the passenger is not uncomfortably bound to the seat. Accordingly, this type of belt is suitable for use in a long driving. However, when an acceleration exceeding the predetermined level (normally 0.3 – 0.7G) is applied to the automobile when heavy brake is applied or the automobile is collided with, the belt must be fixed with reference to the winder to prevent the belt from extending. To this end, an acceleration responsive switch adapted to be closed by the application of an acceleration exceeding the predetermined level to the automobile has been heretofore used for responding to the acceleration to restrict the extension or retraction of the belt. However since in such a switch of the prior art, contacts adapted to be actuated mechanically is employed, it could not provide sufficient durability and reliability because of possible oxidation of the contacts and chattering of the contacts.

The present invention is intended to overcome those difficulties of the prior art and it is, therefore, an object of the present invention to provide a contactless sensor for a positive or negative acceleration responsive switch, which is much durable and reliable as compared with a conventional contact type sensor.

It is another object of the present invention to provide a sensor for a positive or negative acceleration responsive switch which can detect the acceleration applied in any horizontal direction and vertical direction and which is responsive to the acceleration applied in leftward, rightward, forward or backward directions as well as the acceleration due to violent vibration of the automobile.

It is a further object of the present invention to provide a sensor for a positive or negative acceleration responsive switch which is simple in construction and easy to manufacture, rendering the manufacturing cost lower.

According to the present invention, there is provided a sensor for a positive or negative acceleration responsive switch, comprising a bowl having a reverse conical wall at its upper peripheral surface, made of an insulating material and secured horizontally to a moving body; a tuning coil disposed at a lower portion of said bowl to form a part of an oscillation circuit; and a conductive medium placed in said bowl and adapted to be displaced under the acceleration applied in any horizontal direction, the acceleration being detected in response to the distance of said conductive medium from said tuning coil.

The present invention will be better understood from the following description taken in connection with the accompanying drawings in which.

In the drawings and the following descriptions, like portions or parts are denoted by like numerals or characters.

Figure 1:
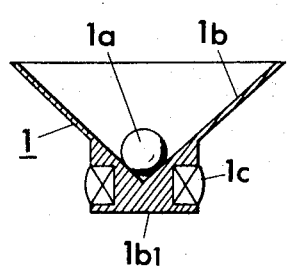
FIG. 1 is a sectional view of one form of a sensor for a positive or negative acceleration responsive switch embodying the present invention.

Referring now to FIG. 1, a sensor 1 for a positive or negative acceleration responsive switch comprises a conductive medium or a conductive ball 1a which is displaceable under the positive or negative acceleration applied to a moving body such as an automobile, a bowl 1b having a reverse conical wall at its upper peripheral surface and made of insulating materials, and a tuning coil 1c fixed to the bottom $1b_1$ of the bowl 1b. The ball 1a is disposed in the bowl 1b.

Figure 3:
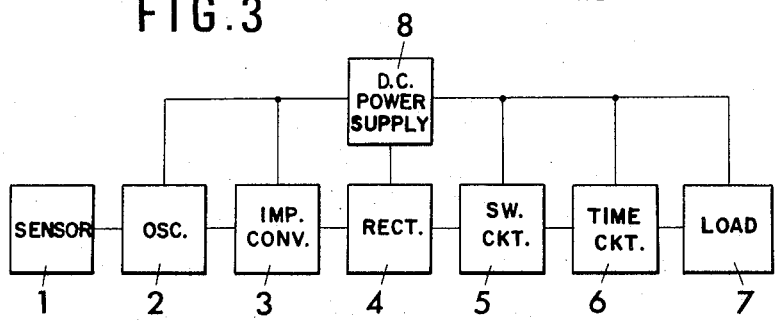
FIG. 3 is a block diagram showing one form of a positive or negative acceleration switch employing the sensor of the present invention.

FIG. 3 is a block diagram for driving a load, such as a plunger for restricting extension and retraction of a seat belt in a seat-belt winder, in cooperation with the above-mentioned sensor 1. In this figure, numeral 1 represents the sensor as mentioned above, 2 a tuning oscillator circuit including the tuning coil 1c of the sensor 1, 3 an impedance converter circuit, 4 a rectifier circuit, 5 a switching circuit, 6 a time-holding circuit, 7 a load, and 8 a D.C. power supply.

In operation of the arrangement shown, the sensor 1 is mounted horizontally on the moving body such as an automobile. When the moving body is running at a normal constant speed or is not running, no external force is exerted to the ball 1a so that it is positioned at the central portion of the reverse conical surface of the bowl 1b and therefore it is in the position closest to the tuning coil 1c. Under this condition, due to a large eddy-current loss and hysteresis loss by the ball 1a, the oscillation condition of the tuning oscillator circuit 2 is not satisfied and no oscillation is caused in said tuning oscillator circuit 2. As a result, the switching circuit 5 is not actuated to supply power to the load 7. Thus, it will be seen that in case the arrangement is used as a positive or negative acceleration detecting switch for a seat-belt winder, the belt winder is not locked and left in a state to allow free extension or retraction of the belt.

Figure 2:
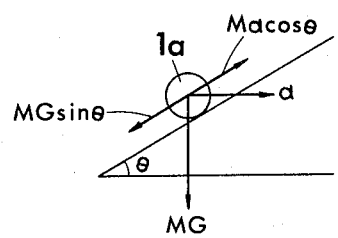
FIG. 2 is a vector diagram of the sensor shown in FIG. 1.

When a positive or negative acceleration $\alpha$ is applied to the moving body such as an automobile by abrupt starting, abrupt stopping, running across a sharp curve or colliding of the moving body such as an automobile, the vector of the ball with reference to the inclined surface of the bowl 1b is described with reference to FIG. 2, wherein M represents a mass of the ball 1a, G an acceleration of the gravity of the earth, $\theta$ an angle between the inclined surface of the bowl $1b$ and a horizontal line, assuming that there is no friction between the bowl $1b$ and the ball $1a$. The component of an inertia of the ball $1a$ due to the acceleration $\alpha$ applied to the moving body, which is in parallel with the inclined surface of the bowl, is expressed by $M\alpha \cos\theta$ while the corresponding component of the force due to the acceleration by the gravity of the earth is expressed by $MG\sin\theta$. In case $M\alpha\cos\theta < MG\sin\theta$, to wit, $\alpha < G\tan\theta$, the ball $1a$ rests at the same position as occupied thereby when the moving body is runnung at a normal constant speed or is not running so that the tuning oscillator circuit 2 does not oscillate.

On the other hand, in case $\alpha > G\tan\theta$, the ball $1a$ starts to rise along the inclined surface of the bowl $1b$, moving away from the tuning coil $1c$. As a result, the eddy-current loss and hysteresis loss due to the ball $1a$ is reduced to meet the oscillation condition of the tuning oscillator circuit 2 so that the tuning oscillator circuit 2 starts to oscillate. The oscillation current will flow through the impedance converter circuit 3 to the rectifier circuit 4 where it is rectified to provide a D.C. signal current which, in turn, drives the switching circuit 5. When the switching circuit 5 is thus actuated, the time-holding circuit 6 is operated to hold the status of the switching circuit 5 for a desired period. Thus, the load 7 is supplied with power for the desired period. When the load 7 is energized, the belt winder of the automobile is locked to prevent the extension or retraction of the seat belt in case the arrangement of the present invention is used for seat-belt winder. The time-holding circuit 6 is provided to prevent the seat belt from, otherwise, possibly being extended or retracted by a momentary return of the ball $1a$ to the central portion of the bowl $1b$ due to a violent movement of said ball $1a$ caused, for example by collision of the automobile.

Figure 4:
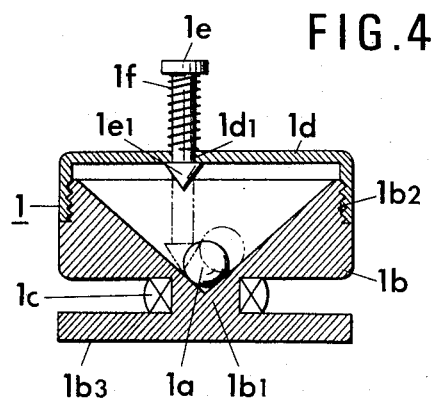
FIG. 4 is a sectional view illustrating another form of a sensor embodying the present invention.

FIG. 4 shows a modified form of a sensor 1 in which $1d$ represents a lid having a female thread engageable with a male thread $1b_2$ formed around the periphery of the upper portion of a bowl $1b$. The lid $1d$ has a bore $1d_1$ formed at a position slightly offset from the center. Inserted in the bore $1d_1$ is an actuator member $1e$ having an enlarged portion $1e_1$ at its lower end. A spring $1f$ is fitted to the actuator member $1e$ for normally urging the actuator member $1e$ upwardly. The bowl $1b$ has an integrally formed base plate $1b_3$. With such an arrangement, when the actuator member $1e$ is depressed either manually or electrically against a spring force of the spring $1f$, the ball $1a$ in the bowl $1b$ will be displaced out of the central portion of the enlarged portion $1e_1$ of the actuator member $1e$ so that the load 7 is energized in a similar manner as in the case an acceleration is applied to the moving body as mentioned above. This allows to examine or check the operation of the positive or negative acceleration responsive switch.

In the above-mentioned embodiments, the operative acceleration of the acceleration responsive switch may be determined by the angle of inclination of the reverse conical surface of the bowl $1b$.

In the embodiments, the ball $1a$ is formed of a solid material such as a metallic material. It should be understood to those skilled in the art that the similar effect may be expected in case conductive liquid such as mercury is used as a conductive medium in place of the solid material. It should also be understood that the appliation of the sensor of the present invention is not limited to the detection of acceleration applied to the automobile but it is applicable to the detection of acceleration applied to any moving body.

As described hereinabove, since in the present invention, the tuning coil of the oscillator circuit is mounted on the reverse conical bowl and the conductive ball or conductive liquid is placed in the bowl which is displaceable with reference to the bowl under the positive or negative acceleration applied to the moving body to which the bowl is secured, any acceleration applied not only in the horizontal direction but also in the vertical direction can be detected because the ball or the liquid is displaced relative to the bowl when the bowl is violently moved up and down. Furthermore, since the acceleration is detected according to the distance between the tuning coil and the conductive medium, no contact is required so that the sensor is made more durable and reliable in operation, simpler in structure and lower in cost.

What is claimed is:

1. A sensor for positive or negative acceleration responsive switch, comprising a bowl for fixed location horizontally of a moving body, said bowl having a reverse conical wall at its upper peripheral surface and being of an insulating material; a tuning coil disposed at a lower portion of said bowl usable to form a part of an oscillation circuit; and means defining a conductive medium freely displaceable in said bowl for changing the distance thereof from said tuning coil in response to acceleration of said bowl in any horizontal direction, the acceleration being detected in response to the distance of said conductive medium from said tuning coil.

2. A sensor for positive or negative acceleration responsive switch as claimed in claim 1, wherein said conductive medium is a ball made of a solid material.

3. A sensor for positive or negative acceleration responsive switch as claimed in claim 1, wherein said conductive medium is mercury.

4. A sensor for positive or negative acceleration responsive switch, comprising a bowl having a reverse conical wall at its upper peripheral surface, made of an insulating material and secured horizontally to a moving body; a tuning coil disposed at a lower portion of said bowl to form a part of an oscillation circuit; and a conductive ball of a solid material placed in said bowl and adapted to be displaced under an acceleration applied in any horizontal direction, the acceleration being detected in response to the distance of said conductive ball from said tuning coil; a lid threadedly fitted to said bowl; and an actuator member inserted in a bore formed on said lid at a position slightly offset from the center thereof and provided with an enlarged portion at the lower end of said actuator member, said actuator member being adapted to displace, when depressed, the conductive ball away from the central portion of the bowl.

5. A sensor for a positive or negative acceleration responsive switch as claimed in claim 1, in which said tuning coil is spaced from the central portion of said conical wall and from the rest position of said displaceable conductive medium, adjacent said central portion, by a portion of the insulating material of said bowl.

6. A sensor for a positive or a negative acceleration responsive switch as claimed in claim 5, in which said tuning coil is fixed with respect to said ball in surrounding relation with said central portion of said conical wall and below the rest position of said displaceable conductive medium, whereby displacement of said conductive medium along the conical wall away from the central portion thereof reduces losses in the tuning coil, enabling same to change the state of said oscillation circuit.

7. A sensor for a positive or a negative acceleration responsive switch as claimed in claim 1, in which said reverse conical wall defines a substantially conical space extending above the central portion of said conical wall to a distance substantially exceeding the size of said displaceable conductive medium and in which said displaceable conductive medium is freely movable out of operative relation with said tuning coil both along the conical wall and upwardly therefrom in response to sideward or downward acceleration of said bowl.

8. A sensor for a positive or a negative acceleration responsive swtich as claimed in claim 1, including an oscillator circuit coupled to said tuning coil, means for rectifying the output of said oscillator circuit to provide a d.c. potential in response to operation of the oscillator circuit, a switch circuit energizable by said rectifier and a timing circuit responsive to actuation of said switch circuit for energizing a load for a preselected type.

9. A sensor for a positive or negative acceleration responsive switch as claimed in claim 8, including an impedance conversion circuit interposed between said oscillator and rectifier.

10. A sensor for a positive or a negative acceleration responsive switch as claimed in claim 8, in which said conductive medium is displaceable upon acceleration of the bowl from a rest position adjacent the central portion of the conical wall, said coil being fixedly supported by said bowl below and adjacent and in insulated relation with respect to such rest position and substantially coaxially of the apex of said conical wall.

11. A sensor for a positive or a negative acceleration responsive switch as claimed in claim 10, in which said bowl has a bottom portion extending below said conical wall, said coil being radially recessed in said bottom portion.

* * * * *

UNITED STATES PATENT OFFICE
CERTIFICATE OF CORRECTION

Patent No. 3,771,370      Dated November 13, 1973

Inventor(s) Katsuyuki Takagi and Tatsuo Kato

It is certified that error appears in the above-identified patent and that said Letters Patent are hereby corrected as shown below:

Col. 4, line 67; change "ball" to ---bowl---.

Signed and sealed this 16th day of July 1974.

(SEAL)
Attest:

McCOY M. GIBSON, JR.
Attesting Officer

C. MARSHALL DANN
Commissioner of Patents